July 30, 1946.  S. J. LIDDINGTON  2,404,969
ELECTRICAL MACHINE
Filed July 7, 1944

WITNESSES:
N. F. Green.
F. P. Lyle

INVENTOR
Stanley J. Liddington.
BY O. D. Buchanan
ATTORNEY

UNITED STATES PATENT OFFICE 2,404,969

ELECTRICAL MACHINE

Stanley J. Liddington, Hamilton, Ontario, Canada, assignor to Westinghouse Electric Corporation, East Pittsburgh, Pa., a corporation of Pennsylvania Application July 7, 1944, Serial No. 543,820

4 Claims. (Cl. 171—322)

The present invention relates to collector ring assemblies for dynamo-electric machines, such as wound-rotor induction motors.

The principal object of the invention is to provide a collector ring assembly of light and inexpensive construction which avoids the necessity of shrinking collector rings on a sleeve or bushing for mounting on the shaft of a machine, as in the usual constructions which have previously been used.

Another object of the invention is to provide a collector ring assembly which is of simple design, and which is very well ventilated by circulation of air on all sides of the rings, so that the temperature rise in service is very low.

A further object of the invention is to provide a collector ring assembly which can readily be disassembled and reassembled in the field, so that when necessary, worn collector rings can be replaced, or the assembly reinsulated, while it is in place on its machine, thus avoiding the necessity of removing the assembly as a whole from the machine and returning it to the factory for such repairs, with consequent expense and loss of service of the machine for a considerable time. Such repairs have necessarily had to be made at the factory with prior constructions consisting of collector rings which were shrunk on a sleeve or bushing, because of the necessity of proper facilities for performing the shrinking operation, which are usually not available in the field.

Figure 1:
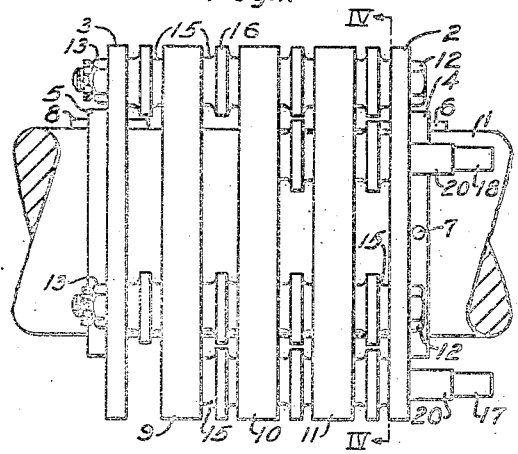
Figure 2:
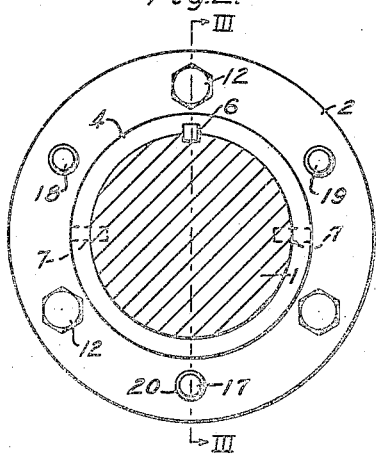
Figure 3:
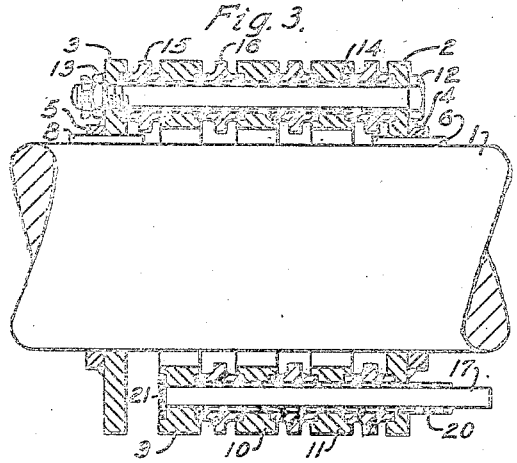
Figure 4:
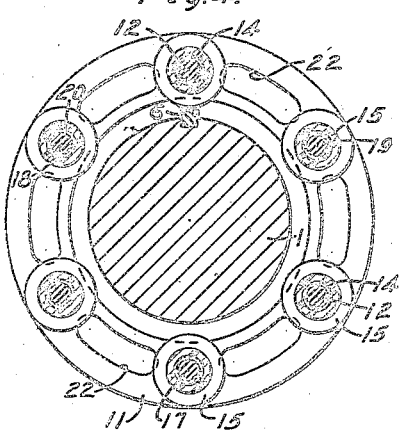

Further objects and advantages of the invention will be apparent from the following detailed description, taken in connection with the accompanying drawing, in which:

Figure 1 is a side elevation of a collector ring assembly embodying the invention, Fig. 2 is an end view of the assembly of Fig. 1, Fig. 3 is a longitudinal sectional view, approximately on the line III—III of Fig. 2, and Fig. 4 is a transverse sectional view, approximately on the line IV—IV of Fig. 1.

A collector ring assembly embodying a preferred form of the invention is shown in the drawing mounted on the shaft 1 of a dynamo-electric machine. The machine itself has not been shown, since its construction forms no part of the invention, and the new collector ring assembly can be used on any type of machine in which it is necessary to make electrical contact to a winding carried on a rotating part of the machine. The collector ring assembly is supported on the shaft 1 by means of two support rings 2 and 3, having axial flanges 4 and 5, respectively. The flanges 4 and 5 have been shown as being welded to the respective support rings, but it will be apparent that they could equally well be formed integrally with the rings. The support ring 2 at the inner end of the assembly, that is, the end towards the rotor of the dynamo-electric machine, has a light press fit on the shaft, and a key 6 may be provided engaging corresponding keyways in the ring and the shaft. The support ring 2 is rigidly secured to the shaft 1 by means of a pair of dowel pins 7 which extend through the flange 4 into the shaft, and the material of the flange 4 may be lightly peened over around the dowel pins 7 in order to secure them in position. The support ring 3 at the opposite end of the assembly has a snug or sliding fit on the shaft 1 which permits it to move axially, and a key 8 is provided engaging in corresponding keyways in the shaft and the ring 3 to prevent rotation of the ring with respect to the shaft while permitting it to move longitudinally. The keys 6 and 8 extend axially of the shaft to keep the rings 2 and 3 in alignment thus preventing independent radial or circumferential movement of the rings with respect to the shaft.

The assembly is held together, and the collector rings 9, 10 and 11 are supported, by means of three support bolts 12 which extend longitudinally through the support rings 2 and 3. The support rings 2 and 3 and the collector rings 9, 10 and 11 have holes drilled through them in corresponding positions for the reception of the three bolts 12, which are equally spaced apart circumferentially of the rings. The bolts 12 have heads at one end which engage the fixed support ring 2, and are provided with nuts 13 at the opposite end to engage the support ring 3. The nuts 13 are preferably of a type which can be locked in position, such as the castle nuts shown, so as to prevent loosening of the nuts when the assembly is in service. The bolts 12 are insulated from the collector rings by means of sleeves or tubes 14 of insulating material which fit snugly on the bolts 12 and extend over the entire distance between the rings 2 and 3.

The collector rings 9, 10 and 11, as stated above, are supported on the bolts 12. The rings are spaced apart and insulated from each other by means of insulating spacer members 15, which are generally tubular, as shown, and which preferably have a radial rib or flange 16 to increase the creepage distance across the spacers between adjacent rings. The spacers 15 fit snugly on the insulating sleeves 14, and fit into counterbored recesses in the opposite sides of the collector rings. Preferably, the holes in the collector rings through which the bolts 12 extend are made of slightly greater diameter than the outside diameter of the insulating sleeves 14, so that the collector rings are supported on the bolts by means of the spacers 15, which fit tightly into the recesses in the rings, rather than being supported directly on the bolts. This avoids any danger of the insulating sleeves 14 being chafed, or worn through, by the collector rings, which might result in short-circuiting the rings through the bolts 12. It is to be noted that the radial position of the bolts 12 with respect to the shaft 1, and the dimensions of the collector rings, are such that the inner peripheries of the rings are spaced radially from the shaft, so that there is ample space between the rings and the shaft for the circulation of ventilating air, and also adequate clearance for electrical insulation between the rings and the shaft.

Electrical connection to the collector rings 9, 10 and 11 is effected by means of conducting studs 17, 18 and 19. These studs extend through suitable openings in the support ring 2 and the collector rings, and each stud extends to one collector ring to which it is brazed, and is insulated from the other rings by means of an insulating tube or sleeve 20 fitting snugly over the stud. Spacer members 15 are provided on the studs 17, 18 and 19 to space the collector rings apart and to insulate them from each other in the same manner as the spacers on the bolts 12. As shown in the drawing, the stud 17 extends through holes in the collector rings 10 and 11, and is insulated from them, and is brazed to the ring 9, as indicated at 21. Similarly, the stud 18 extends through the collector ring 11, and is brazed to the ring 10, while the stud 19 extends only to the ring 11 and is brazed to it. Since the three studs extend axially through the support ring 2 and are readily accessible, the windings of the machine are easily connected to the studs in any suitable manner, as by brazing.

It will be apparent that the structure described above can readily be assembled on the supporting bolts 12, after they have been inserted through the fixed support ring 2, and the assembly is clamped rigidly together by tightening the nuts 13 on the bolts 12, the support ring 3 sliding on the shaft to permit such tightening. In the same way, the structure can be disassembled by removing the nuts 13 and sliding the ring 3 axially to permit the spacers 15 and the collector rings 9, 10 and 11 to be removed from the bolts 12, so that new rings, or new insulation, or both, can easily be put in place without removing the entire assembly and returning it to the factory, which was necessary with previous types of construction in which the collector rings were shrunk on a sleeve or bushing. Inspection of the assembly can be facilitated by making the collector rings 9, 10 and 11 and the support rings 2 and 3 of the same initial diameter. The support rings 2 and 3 can then be used for reference to determine the amount of wear of the collector rings which has occurred in service.

It will be noted that the construction described is very simple, and results in a relatively light construction. The collector rings 9, 10 and 11 can also be lightened by providing openings 22 in them, which reduce the material required as well as decreasing the weight of the rings. The openings 22 also assist in ventilation by increasing the surface area of the rings over which air may flow. Since the rings are spaced radially from the shaft, very good ventilation is obtained because air can flow freely on all sides of the rings and thus the temperature rise of the assembly in service is kept quite low. The axially movable support ring 3 is also an important feature of the invention, since the provision of this movable ring not only facilitates assembly and disassembly but also prevents warping or excessive stresses resulting from temperature changes since the ring can move axially and adjust its position as the assembly expands and contracts with changes in temperature.

It should now be apparent that a collector ring assembly has been provided which is very advantageous because of its simplicity and low cost, as well as because of the good ventilation and ease of assembly and disassembly. A preferred embodiment of the invention has been shown and described for the purpose of illustration, but it is to be understood that various modifications and changes may be made, and the invention is, therefore, not limited to the specific details of construction shown, but in its broadest aspects it includes all equivalent embodiments and modifications which come within the scope of the appended claims.

I claim as my invention:

1. A collector ring assembly for mounting on the shaft of a dynamo-electric machine, said assembly comprising a pair of support rings mounted on the shaft, one of said support rings being rigidly secured to the shaft, and the other of said support rings being axially movable with respect to the shaft, a plurality of bolts extending axially of the shaft between said support rings, a plurality of collector rings supported on said bolts and spaced radially from the shaft, means for insulating the collector rings from the bolts, and tubular insulating spacer members on the bolts between the collector rings.

2. A collector ring assembly for mounting on the shaft of a dynamo-electric machine, said assembly comprising a pair of support rings mounted on the shaft, one of said support rings being rigidly secured to the shaft, and the other of said support rings being axially movable with respect to the shaft, a plurality of bolts extending axially of the shaft between said support rings, a plurality of collector rings supported on said bolts and spaced radially from the shaft, means for insulating the collector rings from the bolts, and tubular insulating spacer members on the bolts between the collector rings, said spacer members extending into recesses in the collector rings, whereby the spacing members support the rings on the bolts.

3. A collector ring assembly for mounting on the shaft of a dynamo-electric machine, said assembly comprising a pair of support rings mounted on the shaft, one of said support rings being rigidly secured to the shaft, and the other of said support rings being axially movable with respect to the shaft, a plurality of bolts extending axially of the shaft between said support rings, a plurality of collector rings supported on said bolts and spaced radially from the shaft, means for insulating the collector rings from the bolts, tubular insulating spacer members on the bolts between the collector rings, and a plurality of conducting members extending longitudinally through the collector rings, each of said conducting members being electrically connected to one of the rings and insulated from the other rings.

4. A collector ring assembly for mounting on the shaft of a dynamo-electric machine, said assembly comprising a pair of support rings mounted on the shaft, one of said support rings being rigidly secured to the shaft, and the other of said support rings being axially movable with respect to the shaft, a plurality of bolts extending axially of the shaft between said support rings, a plurality of collector rings supported on said bolts and spaced radially from the shaft, means for insulating the collector rings from the bolts, tubular insulating spacer members on the bolts between the collector rings, said spacing members extending into recesses in the collector rings, whereby the spacing members support the rings on the bolts, and a plurality of conducting members extending longitudinally through the collector rings, each of said conducting members being electrically connected to one of the rings and insulated from the other rings.

STANLEY J. LIDDINGTON.